Jan. 12, 1965   R. H. PFLEGER   3,165,305
CUSHIONING BUMPER FOR LOADING DOCKS
Filed March 20, 1963

Inventor
Robert H. Pfleger
By
Attorney

United States Patent Office 3,165,305
Patented Jan. 12, 1965

3,165,305
CUSHIONING BUMPER FOR LOADING DOCKS
Robert H. Pfleger, Milwaukee, Wis., assignor to Kelley Company, Inc., Milwaukee, Wis., a corporation of Wisconsin
Filed Mar. 20, 1963, Ser. No. 266,624
1 Claim. (Cl. 267—1)

This invention relates to truck dock bumpers of the type adapted to be mounted on the front face of a loading dock to protect both the dock and a truck backing up into position to be loaded or unloaded. This invention is thus classifiable with that of the Schuyler Patent No. 2,649,295.

Bumpers of this type generally consist of a stack of flat rubber or rubber-like units rectangular in shape and usually cut from discarded automobile tire casings. This stack of resilient pieces or units is clamped between a pair of stiff end plates which are held together by one or more tie rods. The end plates usually have some attaching means fixed thereto by which the entire bumper may be mounted on the front face of a dock in position to be engaged by the rear end of a truck being backed into loading or unloading position in front of a dock.

All bumpers of this type heretofore available have had one serious defect. After the bumpers were in service for a while, they would sag in the middle. Not only did this result in a very unsightly appearance—it also detracted from the usefulness of the bumper. The present invention eliminates this defect.

This invention also has as its purpose to provide an improved manner of mounting dock bumpers, whereby a plurality of bumpers can be mounted in close end-to-end relation with all of the bumpers in exact alignment and bearing solidly against the face of the dock so as to afford dock-length protection without unsightly unprotected gaps.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention, constructed according to the best mode so far devised for the practical application of the principles thereof, and in which.

Figure 1:
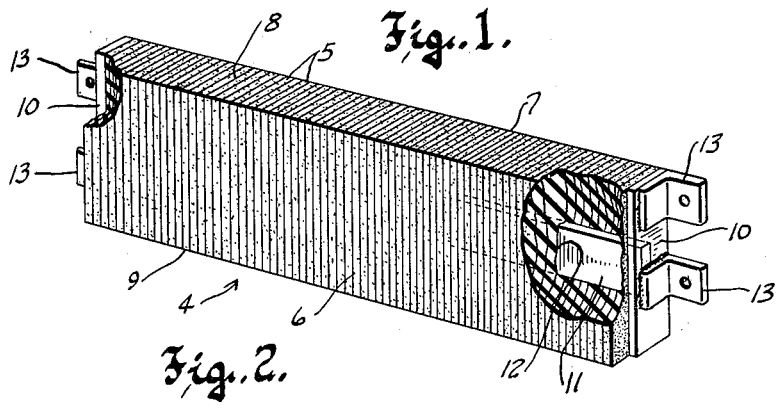
FIGURE 1 is a perspective view of a truck dock bumper embodying this invention, said view having a portion thereof broken away and in section to better illustrate structural details.
Figure 2:
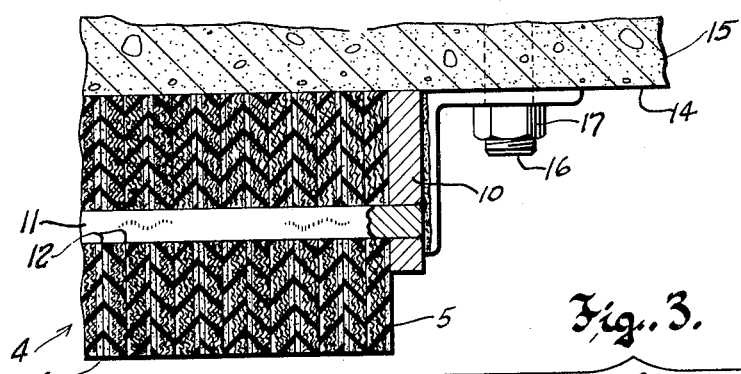
FIGURE 2 is a fragmentary longitudinal sectional view through one end portion of the bumper illustrating the same mounted.

Referring now particularly to the accompanying drawing, the numeral 4 indicates generally a stack of resilient units, each of which is a flat plate-like member 5 rectangular in shape, so that the stack has wide front and rear faces 6 and 7, respectively and narrow top and bottom faces 8 and 9, respectively. This stack of resilient units is clamped between a pair of stiff metal end plates 10 by means of a bar 11 which has its ends solidly secured to the plates 10 and passes through aligned holes 12 in the resilient units.

Preferably the resilient units 5 are made of tough rubber and fabric sections cut from the tread portion of discarded truck tires. The stack is held under great pressure at the time the ends of the tie bar 11 are secured to the end plates 10, the securement being effected preferably by welding.

Attention is directed to the fact that the end plates 10 have their rear edges flush with the rear face of the stack and their top and bottom edges flush with the top and bottom faces of the stack, but the front edge of the end plates is spaced rearwardly of the front face of the stack. Accordingly, when the bumper is mounted in position, the end plates will not be damaged by a truck backing against the bumper, nor will the end plates interfere with the cushioning function of the bumper.

Each end plate 10 has a pair of substantially identical mounting angles 13 welded thereto. These angles are preferably short lengths of angle iron. At one end of the bumper, one of the mounting angles is flush with the top face of the bumper and the other is spaced from that top angle and from the bottom face of the bumper a distance slightly greater than the width of the mounting angles, while at the opposite end of the bumper the situation is reversed, so that one of the mounting angles is flush with the bottom face of the stack.

Figure 3:
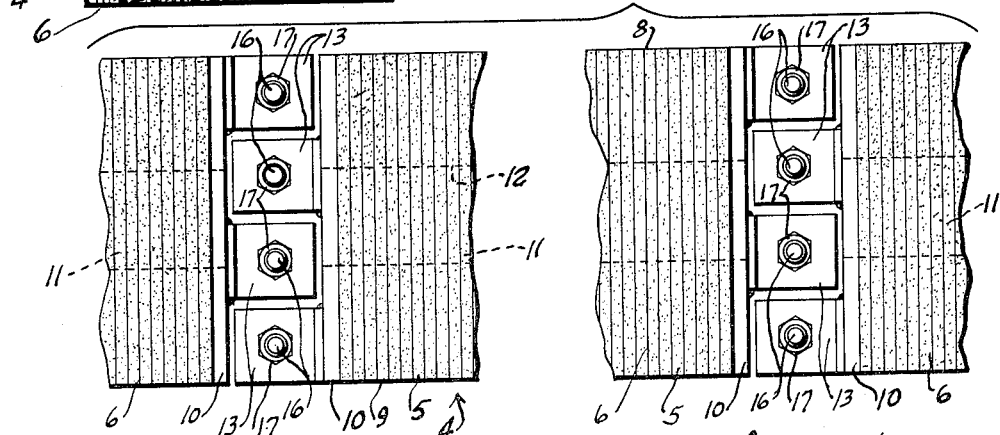
FIGURE 3 is a front view of a plurality of bumpers (with the medial portion of the middle bumper broken away) to illustrate the close end-to-end disposition made possible by the mounting means of this invention.

This offset relationship in the location of the mounting angles at the opposite ends of the bumper enables the mounting angles of endwise adjacent bumpers to be inter-engaged or interlaced, as shown in FIGURE 3, to permit close end-to-end disposition of the bumpers in exact alignment and flat against the front face 14 of a dock 15. Studs 16 anchored in the dock 15 and passing through holes in the attaching flanges of the mounting angles with clamping nuts 17 threaded on the studs, secure the bumpers to the dock.

Obviously, of course, where the bumpers are not intended to be mounted in a row, the mounting angles need not be arranged in the offset or staggered manner described and shown, but could be symmetrically located.

An important feature of this invention resides in the rectangular cross section of the tie bar 11 and its specific orientation disposing its wide flat sides in parallelism with the front and rear faces of the stack of resilient units. Thus, by having the tie bar fit snugly in the holes 12 in the resilient units, great strength against sagging of the bumper in its middle is achieved. Because the stack of resilient units has this rectangular tie bar extending therethrough from end-to-end, and because of the described orientation of the bar with respect to the cross sectional shape of the stack, and as seen in the drawing, especially FIGURE 3, the width of the bar is on the order of one-third the length of the long sides of the rectangular units, the bumper will not sag in the middle as was so often the case in bumpers of this type heretofore available, especially after they had been in use for some time. Consequently, the bumper of this invention not only retains its appearance of strength and vigor throughout many years of useful life, but has all portions thereof most strategically located when mounted on a dock.

From the foregoing description, taken in connection with the accompanying drawing, it will be apparent to those skilled in this art that this invention provides a substantial improvement in dock bumpers used to protect docks and trucks, and that by virtue of its novel features, the bumper of this invention not only retains its appearance of strength and vitality, but can be mounted in close end-to-end relationship with other similar bumpers, with all of the bumpers flat against the front face of the dock to which they are secured, and all of them in exact alignment, to thus provide full length dock protection without unsightly unprotected gaps.

What is claimed as my invention is:

A bumper for truck loading docks comprising:

A. a stack of flat uniform thickness rectangular units of resilient material, said stack having wide front and rear faces and narrow top and bottom faces and the individual units having aligned rectangular centrally located holes, with long sides that are parallel to the long sides of the rectangular units and hence parallel to the wide front and rear faces of the stack and much narrower top and bottom ends;

B. a stiff metal end plate flatwise overlying the outer face of each endmost unit of the stack;

C. a single straight metal bar extending through the aligned holes in said resilient unit and having its ends secured to the metal end plates to tie the latter together with the stack of units tightly clamped therebetween, said bar having a uniform rectangular cross section for its entire length of a size and shape to snugly fit the aligned rectangular holes in the units so that the wide flat sides of the bar are parallel to the flat front and rear faces of the stack of units, the width of the bar being on the order of one-third of the length of the long sides of the rectangular units so that (1) the bar provides good straight support against sagging of the stack in the middle when the bumper is mounted by its ends with its flat front and rear faces vertical; and D. mounting means on the end plates by which the bumper may be secured to the front of a loading dock.

References Cited in the file of this patent

UNITED STATES PATENTS

| | | |
|---|---|---|
| Re. 24,276 | Schuyler | Feb. 12, 1957 |
| 1,239,880 | Cavanaugh | Sept. 11, 1917 |
| 1,448,907 | Bell | Mar. 20, 1923 |
| 2,704,102 | Starr et al. | Mar. 15, 1955 |
| 2,901,020 | Starr et al. | Aug. 25, 1959 |
| 3,047,039 | Fishman | July 31, 1962 |
| 3,063,700 | Talbott | Nov. 13, 1962 |
| 3,096,973 | Bergen | July 9, 1963 |

FOREIGN PATENTS

| | | |
|---|---|---|
| 1,151,730 | France | Aug. 26, 1957 |